Nov. 27, 1928. 1,692,807
H. S. BARNES
POULTRY FEEDER
Filed July 23, 1927 2 Sheets-Sheet 1
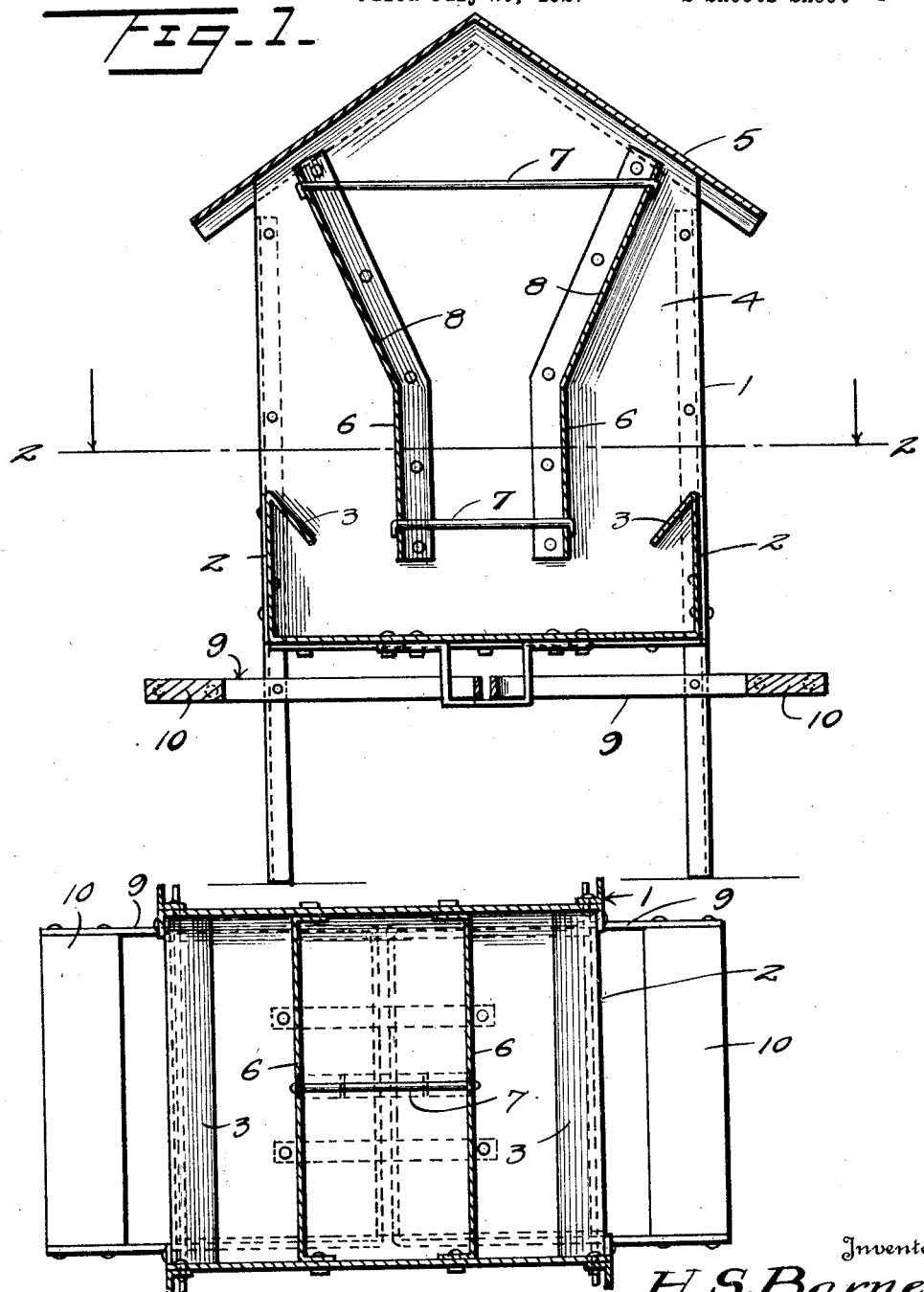

Nov. 27, 1928.
H. S. BARNES
1,692,807
POULTRY FEEDER
Filed July 23, 1927   2 Sheets-Sheet 2
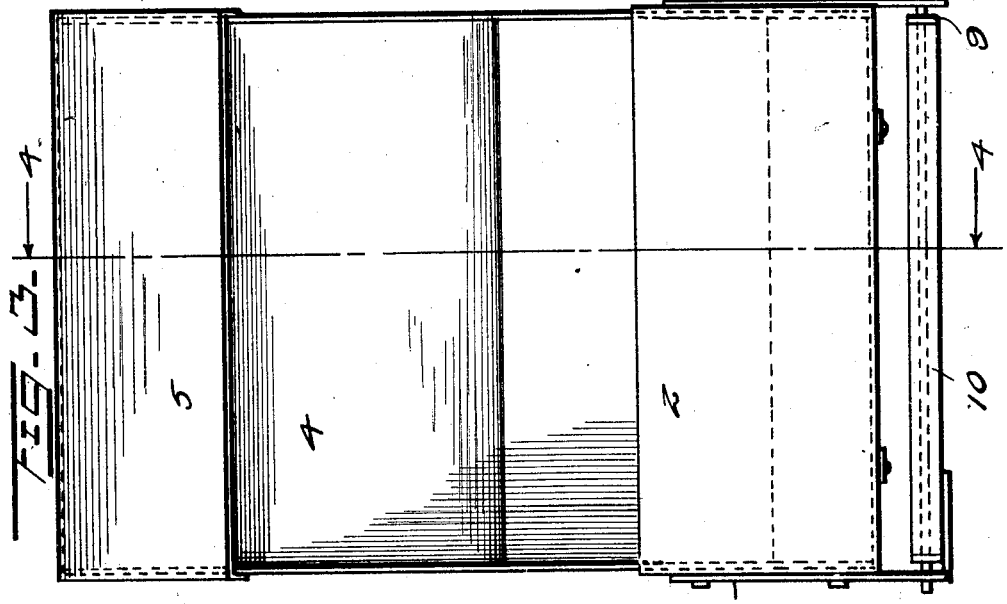
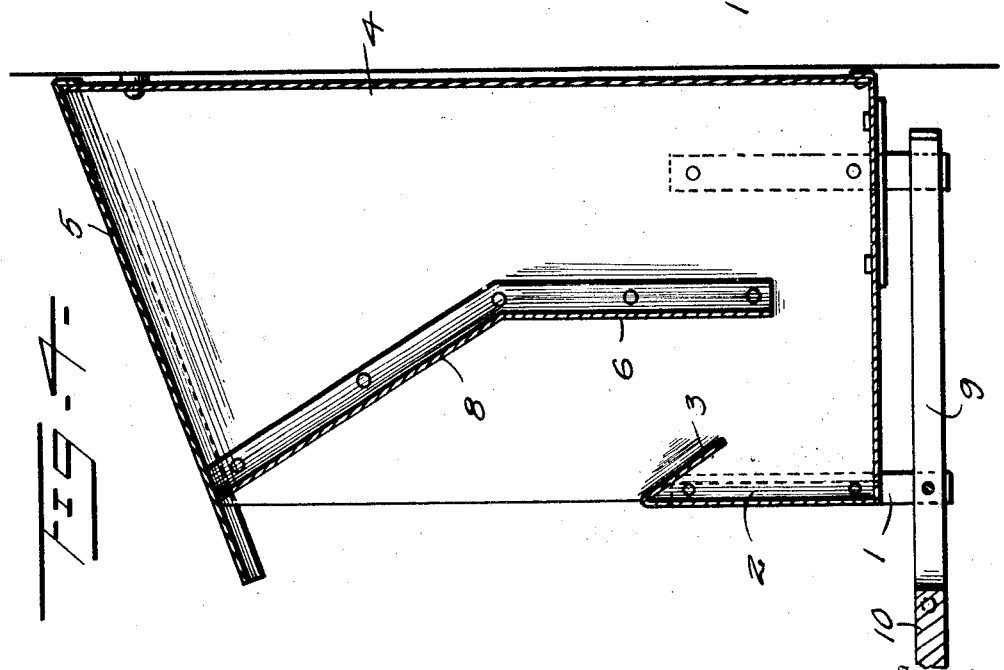
Inventor
H. S. Barnes
By Watson E. Coleman
Attorney Patented Nov. 27, 1928.

1,692,807

UNITED STATES PATENT OFFICE.

HAROLD S. BARNES, OF ALLENTOWN, PENNSYLVANIA.

POULTRY FEEDER.

Application filed July 23, 1927. Serial No. 208,008.

This invention relates to a poultry feeder and it consists in the novel features hereinafter described and claimed.

An object of the invention is to provide a feeder of the character stated which is of simple and durable structure and adapted to retain the feed in an elevated position, so that it will be protected against the ravages of rodents and also protected from the weather.

A further object of the invention is to provide means including a perch upon which the fowls may hop and in doing so cause a portion of the perch to tap the bottom of the feeder, thereby jogging the feed so that it will properly gravitate through the feeder and spread upon the bottom of the trough portion of the feeder.

A still further object of the invention is to provide the side walls of the body of the trough portion of the feeder with inwardly disposed flanges inclined downward and adapted to prevent the fowls from scooping the feed out of the trough and from scattering the feed by swinging their beaks, thus preventing waste.

With these objects in view the feeder consists of a frame which may be placed upon the ground or hung at an elevated position upon a wall. A trough is attached to the frame and is provided at the upper edges of its side walls with inwardly and downwardly inclined flanges. A housing is disposed above the trough and contents and chute adapted to receive the feed and direct the same upon the intermediate portion of the bottom of the trough. A perch structure is pivotally connected with the frame and is adapted to swing with relation thereto so that when the fowls hop upon the perch to get at the feed a portion of the perch will strike the bottom of the trough, jogging the same and causing the feed to gravitate toward and spread upon the bottom of the trough.

Referring to the drawings:

Figure 1 is a transverse sectional view of one form of the feeder.

Figure 2 is a horizontal sectional view cut on the line 2—2 of Figure 1.

Figure 3 is a front elevational view of a modified form of the feeder.

Figure 4 is a sectional view cut on the line 4—4 of Figure 3.

In its various forms the poultry feeder comprises a frame 1 which may serve as a pedestal for supporting the body of the feeder upon the surface of the ground or which may be hung at the side of a wall in any suitable manner. A trough 2 is mounted upon the frame 1 and the side walls of the trough are provided at their upper edges with inwardly and downwardly inclined flanges 3. A housing 4 is disposed above the trough and is provided with a removable cover 5. Said cover is preferably disposed in inclined position so as to shed the water. Hopper partition walls 6 are located within the housing 4 under the cover 5 and above the bottom of the trough 2 and spaced therefrom. These partition walls may be connected together by transverse rods 7 whereby the said walls are prevented from spreading with relation to each other. The upper portions of the walls 6 are upwardly and outwardly inclined as at 8 so that the feed may be received in bulk upon the said inclined portions and may gravitate down through the hopper structure and precipitate upon the intermediate portions of the bottom of the trough.

The perch structure 9 is pivotally connected with the frame 1 at a point below the trough 2 and the inner portion of the perch structure extends under the intermediate portion of the trough 2. The perch structure is provided at its outer part with a platform 10. The inner portion of the perch structure is heavier than the outer portion thereof so that the feed is jolted and distributed along the bottom of the trough and toward the side walls thereof. At the same time this jarring causes some feed to descend through the hopper and enter the trough. The fowl standing upon the platform 10 may stretch its neck over the side walls of the trough and partake of the food located therein. However, the flange 3 will prevent the fowl from scraping the feed out of the trough and also prevent the fowl from scattering the feed with its beak, thus preventing waste. By reason of the inward disposition of the flanges 3, they will return to the feed trough all feed that may drop from the beaks of the fowls or that may be thrown from the trough by the fowls swinging their beaks.

Having described the invention, what is claimed is:

1. A poultry feeder comprising a frame, a housing mounted upon the frame and enclosing a food hopper, a trough mounted upon the frame below the hopper and forming part of the housing, a perch pivoted to the frame, the outer portion of the perch extending beyond the trough and the inner portion being disposed beneath the trough and against which it is adapted to strike when the outer end of the perch is depressed by the weight of a fowl, and means attached to the bottom of the trough and depending below the same limiting the downward movement at the inner end of the perch.

2. A poultry feeder comprising a supporting frame, a metallic housing mounted thereon, a metallic trough forming part of the housing and having a bottom and upwardly extending sides, the upwardly extending sides at their upper ends being formed with downwardly and inwardly extending flanges, a hopper disposed within the housing and discharging downward onto the trough and spaced therefrom, a perch comprising two parallel arms pivoted to the frame and extending beneath the trough in spaced relation thereto, the outer ends of the arms being connected by a perch, the inner ends of the arms being connected by a cross bar, a yoke attached to the under side of the trough and extending downward and supporting the cross bar on the inner end of the perch, the weight of a fowl on the outer end of the perch causing the inner end of the perch to swing upward and strike the metallic bottom of the trough to thus jar the contents of the magazine and cause it to feed downward.

3. A poultry feeder comprising a supporting frame, a metallic housing mounted upon the frame including a metallic trough having a bottom and upwardly extending side walls, the side walls being inwardly and downwardly flanged, a hopper disposed within the housing and having its lower end spaced from the trough and spaced from said flanges, the frame providing depending legs, oppositely disposed pairs of arms pivoted to the legs, the outer end of each pair of arms projecting beyond the side wall of the trough and being connected to provide a perch, the inner end of each pair of arms being connected by a cross bar, a U-shaped yoke attached to the bottom of the trough and through which the cross bars of the two pairs of arms pass whereby to limit the downward movement of the inner ends of the arms.

In testimony whereof I hereunto affix my signature.

HAROLD S. BARNES